US 9,633,446 B2

(12) United States Patent
Wang

(10) Patent No.: US 9,633,446 B2
(45) Date of Patent: Apr. 25, 2017

(54) METHOD, APPARATUS AND COMPUTER PROGRAM PRODUCT FOR SEGMENTATION OF OBJECTS IN MEDIA CONTENT

(71) Applicant: Nokia Corporation, Espoo (FI)

(72) Inventor: Tinghuai Wang, Tampere (FI)

(73) Assignee: Nokia Technologies Oy, Espoo (FI)

( * ) Notice: Subject to any disclaimer, the term of this patent is extended or adjusted under 35 U.S.C. 154(b) by 158 days.

(21) Appl. No.: 14/585,839

(22) Filed: Dec. 30, 2014

(65) Prior Publication Data
US 2015/0235377 A1 Aug. 20, 2015

(30) Foreign Application Priority Data

Feb. 20, 2014 (GB) .................................. 1402977.1

(51) Int. Cl.
*G06K 9/00* (2006.01)
*G06T 7/20* (2017.01)
(Continued)

(52) U.S. Cl.
CPC ...... *G06T 7/2006* (2013.01); *G06F 17/30858* (2013.01); *G06T 7/0081* (2013.01);
(Continued)

(58) Field of Classification Search
CPC ... G06T 7/0081; G06T 7/0087; G06T 7/0097; G06T 7/2066; G06T 7/2006;
(Continued)

(56) References Cited

U.S. PATENT DOCUMENTS 6,731,799 B1 * 5/2004 Sun .................... G06K 9/00369
348/142
6,912,310 B1 6/2005 Park et al.
(Continued)

FOREIGN PATENT DOCUMENTS

CA    2613116 A1    1/2007
CN    102637253 A   8/2012
(Continued)

OTHER PUBLICATIONS

Arbelaez et al., "Contour Detection and Hierarchical Image Segmentation", IEEE Transactions on Pattern Analysis and Machine Intelligence, vol. 33, No. 5, May 2011, pp. 1-20.
(Continued)

*Primary Examiner* — Shefali Goradia
(74) *Attorney, Agent, or Firm* — Nokia Technologies Oy

(57) ABSTRACT

In an example embodiment a method, apparatus and computer program product are provided. The method includes extracting a first set of target-object regions and at least one set of non-target object regions from a plurality of regions of a video content based at least on likelihood information. A plurality of unlabeled regions of the video content are classified based on the first set of target-object regions and the at least one set of non-target object regions to generate a second set of target object regions that is denser than the first set of target object regions. A model is learned for modelling at least one of the target object and non-target objects of the video content based at least on the second set of target object regions. The target object in the video content is segmented based on the model and the second set of target object regions.

21 Claims, 9 Drawing Sheets

(51) Int. Cl.
*G06F 17/30* (2006.01)
*H04N 5/14* (2006.01)
*G06T 7/00* (2017.01)

(52) U.S. Cl.
CPC .......... *G06T 7/0087* (2013.01); *G06T 7/0097* (2013.01); *G06T 7/2033* (2013.01); *G06T 7/2066* (2013.01); *H04N 5/147* (2013.01); *G06T 2207/10016* (2013.01); *G06T 2207/10024* (2013.01); *G06T 2207/20072* (2013.01); *G06T 2207/20076* (2013.01); *G06T 2207/20081* (2013.01); *G06T 2207/30241* (2013.01)

(58) Field of Classification Search
CPC ......... G06T 7/2033; G06T 2207/10024; G06T 2207/20072; G06T 2207/20081; G06T 2207/10016; G06T 2207/30241; G06T 2207/20076; H04N 5/147; G06F 17/30858
See application file for complete search history.

(56) References Cited

U.S. PATENT DOCUMENTS

| | | | |
|---|---|---|---|
| 7,957,592 | B2 | 6/2011 | Huang et al. |
| 8,265,392 | B2 | 9/2012 | Wang et al. |
| 8,358,691 | B1 | 1/2013 | Wang et al. |
| 8,422,775 | B2 | 4/2013 | Wang et al. |
| 8,520,975 | B2 | 8/2013 | Wang et al. |
| 2004/0202368 | A1 | 10/2004 | Lee et al. |
| 2007/0003154 | A1 | 1/2007 | Sun et al. |
| 2008/0285859 | A1* | 11/2008 | Lei .................... G06K 9/00771 382/224 |
| 2011/0032328 | A1* | 2/2011 | Raveendran ....... H04N 13/0003 348/43 |
| 2012/0219209 | A1 | 8/2012 | Shotton et al. |
| 2012/0294530 | A1 | 11/2012 | Bhaskaranand et al. |

FOREIGN PATENT DOCUMENTS

| | | |
|---|---|---|
| CN | 102930539 A | 2/2013 |
| CN | 103020971 A | 4/2013 |
| CN | 103413123 A | 11/2013 |
| WO | 99/63750 A1 | 12/1999 |
| WO | 00/18128 A1 | 3/2000 |
| WO | 2014/075224 A1 | 5/2014 |

OTHER PUBLICATIONS

Endres et al., "Category Independent Object Proposals", Proceedings of the 11th European conference on Computer vision: Part V, 2010, pp. 1-14.
Olson et al., "Single-Cluster Spectral Graph Partitioning for Robotics Applications", Robotics: Science and Systems I, 2005, 8 pages.
Zhou et al., "Learning With Local and Global Consistency", Advances in Neural Information Processing Systems, 2003, 8 pages.
Boykov et al., "Interactive Graph Cuts for Optimal Boundary and Region Segmentation of Objects in N-D Images", International Conference on Computer Vision, vol. 1, Jul. 2001, pp. 105-112.
Reina et al., "Multiple Hypothesis Video Segmentation From Superpixel Flows", Proceedings of the 11th European conference on Computer vision: Part V, 2010, pp. 1-14.
Ellis et al., "Online Learning for Fast Segmentation of Moving Objects", Asian Conference on Computer Vision, vol. 7725, 2013, 14 pages.
Badrinarayanan et al., "Semi-Supervised Video Segmentation Using Tree Structured Graphical Models", IEEE Transactions on Pattern Analysis and Machine Intelligence, vol. 35, No. 11, Nov. 2013, pp. 1-14.
Li et al., "Exploring Visual and Motion Saliency for Automatic Video Object Extraction", IEEE Transactions on Image Processing, vol. 22, No. 7, Jul. 2013, pp. 2600-2610.
Search Report received for corresponding United Kingdom Patent Application No. 1402977.1, dated Aug. 26, 2014, 3 pages.

* cited by examiner

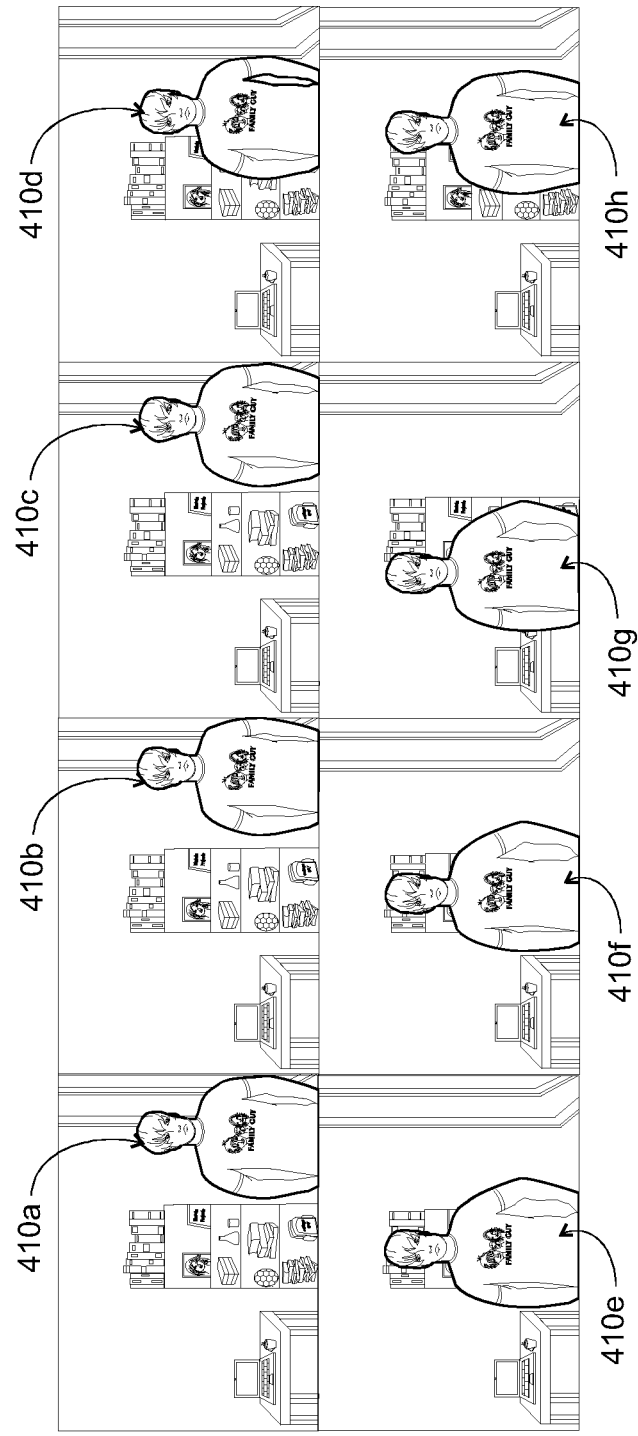

METHOD, APPARATUS AND COMPUTER PROGRAM PRODUCT FOR SEGMENTATION OF OBJECTS IN MEDIA CONTENT

TECHNICAL FIELD

Various implementations relate generally to method, apparatus, and computer program product for segmentation of objects in media content.

BACKGROUND

Various electronic devices such as cameras, mobile phones, and other devices are now widely used for capturing media content and post-capture processing of the media content. In some applications, segmenting respective video images or frames into an object and/or regions of interest and a background has been at the core of many computer vision and computational photography. For example, segmentation of the video object is very critical and fundamental for various digital video applications, such as automatic focusing, white balance, special visual effects, video composition, activity recognition, object 3D reconstruction and object tracking. In such applications, segmentation of the videos for extracting objects requires extensive technical skills and considerable user interaction.

SUMMARY OF SOME EMBODIMENTS

Various aspects of examples embodiments are set out in the claims.

In a first aspect, there is provided a method comprising extracting a first set of target object regions and at least one set of non-target object regions from a plurality of regions of a video content based at least on a likelihood information, the likelihood information being indicative of a likelihood of the plurality of regions to be associated with a target object of the video content; classifying a plurality of unlabeled regions of the video content based on the first set of target object regions and the at least one set of non-target object regions to generate a second set of target object regions, the second set of target object regions being denser than the first set of target object regions; learning a model for modelling at least one of the target object and non-target objects of the video content based at least on the second set of target object regions; and segmenting the target object in the video content based on the model and the second set of target object regions.

In a second aspect, there is provided an apparatus comprising at least one processor; and at least one memory comprising computer program code, the at least one memory and the computer program code configured to, with the at least one processor, cause the apparatus to perform at least: extract a first set of target object regions and at least one set of non-target object regions from a plurality of regions of a video content based at least on a likelihood information, the likelihood information being indicative of a likelihood of the plurality of regions to be associated with a target object of the video content; classify a plurality of unlabeled regions of the video content based on the first set of target object regions and the at least one set of non-target object regions to generate a second set of target object regions, the second set of target object regions being denser than the first set of target object regions; learn a model for modelling at least one of the target object and non-target objects of the video content based at least on the second set of target object regions; and segment the target object in the video content based on the model and the second set of target object regions.

In a third aspect, there is provided a computer program product comprising at least one computer-readable storage medium, the computer-readable storage medium comprising a set of instructions, which, when executed by one or more processors, cause an apparatus to perform at least: extract a first set of target object regions and at least one set of non-target object regions from a plurality of regions of a video content based at least on a likelihood information, the likelihood information being indicative of a likelihood of the plurality of regions to be associated with a target object of the video content; classify a plurality of unlabeled regions of the video content based on the first set of target object regions and the at least one set of non-target object regions to generate a second set of target object regions, the second set of target object regions being denser than the first set of target object regions; learn a model for modelling at least one of the target object and non-target objects of the video content based at least on the second set of target object regions; and segment the target object in the video content based on the model and the second set of target object regions.

In a fourth aspect, there is provided an apparatus comprising: means for extracting a first set of target object regions and at least one set of non-target object regions from a plurality of regions of a video content based at least on a likelihood information, the likelihood information being indicative of a likelihood of the plurality of regions to be associated with a target object of the video content; means for classifying a plurality of unlabeled regions of the video content based on the first set of target object regions and the at least one set of non-target object regions to generate a second set of target object regions, the second set of target object regions being denser than the first set of target object regions; means for learning a model for modelling at least one of the target object and non-target objects of the video content based at least on the second set of target object regions; and means for segmenting the target object in the video content based on the model and the second set of target object regions.

In a fifth aspect, there is provided a computer program comprising program instructions which when executed by an apparatus, cause the apparatus to: extract a first set of target object regions and at least one set of non-target object regions from a plurality of regions of a video content based at least on a likelihood information, the likelihood information being indicative of a likelihood of the plurality of regions to be associated with a target object of the video content; classify a plurality of unlabeled regions of the video content based on the first set of target object regions and the at least one set of non-target object regions to generate a second set of target object regions, the second set of target object regions being denser than the first set of target object regions; learn a model for modelling at least one of the target object and non-target objects of the video content based at least on the second set of target object regions; and segment the target object in the video content based on the model and the second set of target object regions.

BRIEF DESCRIPTION OF THE FIGURES

Various embodiments are illustrated by way of example, and not by way of limitation, in the figures of the accompanying drawings in which:

FIGS. 4A and 4B represents an example of modelling and segmentation of an object in a media content, in accordance with an example embodiment;

DETAILED DESCRIPTION

Example embodiments and their potential effects are understood by referring to FIGS. 1 through 6B of the drawings.

Figure 1:
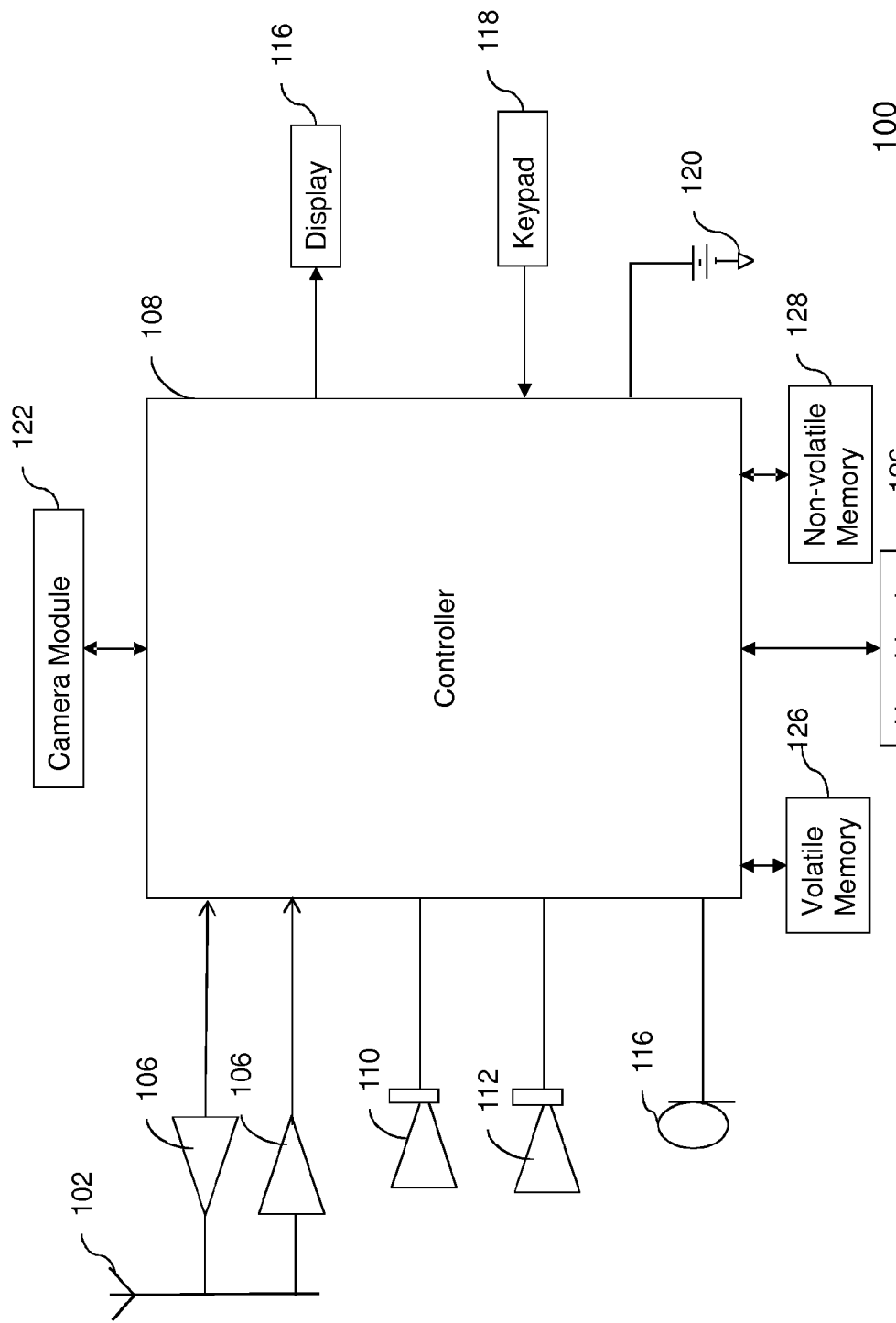
FIG. 1 illustrates a device, in accordance with an example embodiment.

FIG. 1 illustrates a device 100 in accordance with an example embodiment.

It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9 G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as include Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment in which the media capturing element is a camera module 122, the camera module 122 may include a digital camera capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information and data, used by the device 100 to implement the functions of the device 100.

Figure 2:
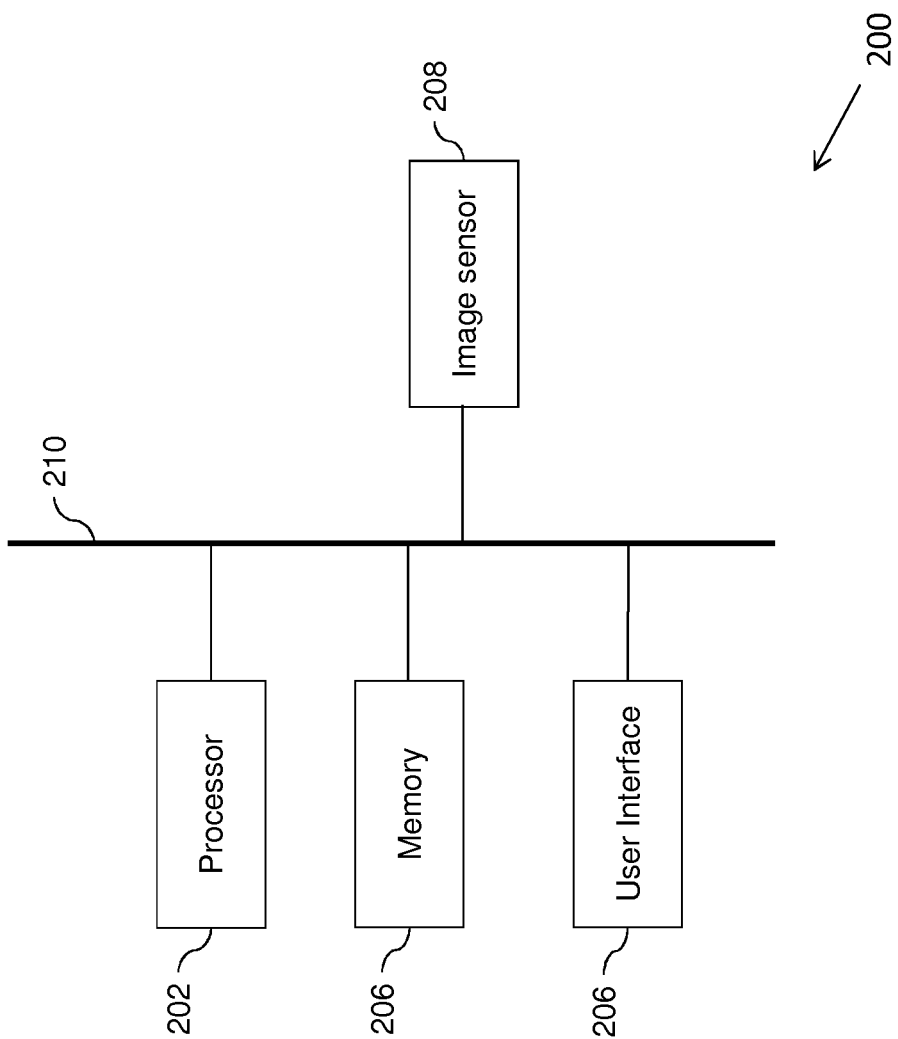
FIG. 2 illustrates an apparatus for segmentation of objects in a media content, in accordance with an example embodiment.

FIG. 2 illustrates an apparatus 200 to perform segmentation of objects in media content, in accordance with an example embodiment. The apparatus 200 may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, (for example, the device 100 or in a combination of devices. Furthermore, it should be noted that the devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory includes, but are not limited to, random access memory, dynamic random access memory, static random access memory, and the like. Some examples of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising media content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TET) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with communication capabilities, computing devices, and the like. Some examples of the electronic device may include a mobile phone, a personal digital assistant (PDA), and the like. Some examples of computing device may include a laptop, a personal computer, and the like. In an example embodiment, the electronic device may include a user interface, for example, the UI 206, having user interface circuitry and user interface software configured to facilitate a user to control at least one function of the electronic device through use of a display and further configured to respond to user inputs. In an example embodiment, the electronic device may include a display circuitry configured to display at least a portion of the user interface of the electronic device. The display and display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus or circuitry to perform the functions of the transceiver. The transceiver may be configured to receive media content. Examples of media content may include audio content, video content, data, and a combination thereof.

In an example embodiment, the electronic may be embodied as to include an image sensor, such as an image sensor 208. The image sensor 208 may be in communication with the processor 202 and/or other components of the apparatus 200. The image sensor 208 may be in communication with other imaging circuitries and/or software, and is configured to capture digital images or to make a video or other graphic media files. The image sensor 208 and other circuitries, in combination, may be an example of the camera module 122 of the device 100. The image sensor 208, along with other components may also be configured to capture images.

These components (202-208) may communicate to each other via a centralized circuit system 210 to perform segmentation of objects in a media content such as videos. The centralized circuit system 210 may be various devices configured to, among other things, provide or enable communication between the components (202-208) of the apparatus 200. In certain embodiments, the centralized circuit system 210 may be a central printed circuit board (PCB) such as a motherboard, main board, system board, or logic board. The centralized circuit system 210 may also, or alternatively, include other printed circuit assemblies (PCAs) or communication channel media.

In an example embodiment, the processor 202 is configured to, with the content of the memory 204, and optionally with other components described herein, to cause the apparatus 200 to facilitate receipt of a media content. In an embodiment, the media content is a video content including video recording or a video shot in a burst mode, for example, for about 3-4 seconds. Examples of the media content may include a video presentation of a television program or a video shot, a short movie shot by a multimedia capturing device, and the like. In an embodiment, the multimedia content may be captured by a media capturing device, for example, the device 100. Examples of the multimedia capturing device may include, but are not limited to, a camera, a mobile phone having multimedia capturing functionalities, and the like. In an embodiment, the multimedia content may be captured by using 3-D cameras, 2-D cameras, and the like. In an embodiment, the multimedia content may be prerecorded and stored in the apparatus, for example the apparatus 200. In another embodiment, the multimedia content may be captured by utilizing the device, and stored in the memory of the device. In yet another embodiment, the device 100 may receive the multimedia content from internal memory such as hard drive, random access memory (RAM) of the apparatus 200, or from external storage medium such as DVD, Compact Disk (CD), flash drive, memory card, or from external storage locations through Internet, Bluetooth®, and the like. The apparatus 200 may also receive the multimedia content from the memory 204.

In an embodiment, the video content may include a plurality of frames. In an embodiment, the plurality of frames of the video content may be referred to as images. In an example embodiment, the processor 202 is configured to, with the content of the memory 204, and optionally with other components described herein, to cause the apparatus 200 to partition the plurality of frames of the video content into a plurality of frame-regions or pixel groups. In an example embodiment, a frame-region of a plurality of frame-regions or a pixel group may include a group of similar pixels that may define a meaningful region. In an example embodiment, different sets of neighboring pixels may be grouped to generate the plurality of pixel groups (or plurality of frame-regions). For instance, a pixel group may be a group of 100 neighboring pixels (that may be combined to form a closed boundary), and the plurality of such pixel groups may be generated in a frame of the video content. The pixel groups facilitate in reducing the complexity of various video processing tasks. In an example embodiment, the groups of pixels (or pixel groups) may be referred to as super-pixels. In an example embodiment, a processing means may be configured to generate a plurality of frame-regions (or super-pixels) in the plurality of frames (or images). An example of the processing means may include the processor 202, which may be an example of the controller 108. In an embodiment, a pre-processing engine embodied in the apparatus 200 may be an example of the processing means.

In an example embodiment, the video content may correspond to a scene having one or more objects. For instance, the scene may include a person walking through a room having objects such as a computer and a cabinet, among other things. In an embodiment, the person may be a foreground portion of the video content while other objects in the room, such as a computer and a cabinet, may be the background portion of the video content. In an embodiment, the apparatus 200 may be caused to segment a target object from the video content. Herein, the term 'target object' may refer to or more objects that may be segmented from the video content. In an embodiment, the target object may be a foreground portion of the scene. In an embodiment, the background portion of the scene may be the non-target object. In the example of the person walking across the room, the person may be the target object that may be segmented from the frames of the video content.

In an example embodiment, the processor 202 is configured to, with the content of the memory 204, and optionally with other components described herein, to cause the apparatus 200 to characterize a visual appearance of the regions of the video content. In an embodiment, for characterizing the visual appearance of the regions, the processor 202 is configured to, with the content of the memory 204, and optionally with other components described herein, to cause the apparatus 200 to compute feature descriptors for the plurality of frame-regions associated with the plurality of frames. In an example embodiment, the feature descriptors may define the characteristic and/or quality of a frame-region. For instance, a frame-region may have a texture that is different from another frame-region and the texture (for example, a texton histogram) may be used to distinguish the frame-region from other frame-regions. In an example scenario, a texton-based texture classifier may be utilized to classify textures based on their texton frequency histograms. Additionally or alternatively, in an example embodiment, a color histogram (CH) of pixels and/or mean color value of pixels in a frame-region may be computed to determine the feature descriptor for that frame-region. In an example embodiment, the TH and the CH may be concatenated to form a single feature vector for each frame-region (or pixel group). In an example embodiment, a processing means may be configured to compute feature vectors for the plurality of frame-regions based on feature descriptors. An example of the processing means may include the processor 202, which may be an example of the controller 108. In an example embodiment, an example of the processing means may include the preprocessing engine associated with the apparatus 200.

In an example embodiment, the processor 202 is configured to, with the content of the memory 204, and optionally with other components described herein, to cause the apparatus 200 to perform extraction of a plurality of target object regions associated with the target object in the plurality of frames of the video content. In an example embodiment, apparatus 200 may be caused to extract a plurality of object 'proposals' in each frame of the plurality of frames, and thereafter rank the object 'proposals'. Based on the ranking, a set of highest ranking object proposals may be extracted from the plurality of object proposals. In an example embodiment, a processing means may be configured to perform extraction of a plurality of target object regions from the plurality of frames of the video content. An example of the processing means may include the processor 202, which may be an example of the controller 108. In an example embodiment, an example of the processing means may include an object modelling engine.

In an example embodiment, to identify the object proposals, the processor 202 is configured to, with the content of the memory 204, and optionally with other components described herein, to cause the apparatus 200 to determine likelihood scores corresponding to the plurality of frame-regions based on a likelihood information. In an embodiment, the likelihood information may be indicative of a likelihood of the plurality of frame-regions to be associated with the target object of the video content. In an example embodiment, a processing means may be configured to determine likelihood scores corresponding to the plurality of frame-regions based on a likelihood information. An example of the processing means may include the processor 202, which may be an example of the controller 108.

In an embodiment, the likelihood information may include an appearance information, a motion information, and a spatial location information associated with the respective frame-regions of the plurality of frame-regions. In an example embodiment, the processing means may include means for determining the likelihood information associated with respective frame-regions of the plurality of frame-regions based on the appearance information, the motion information, and the spatial location information associated with the respective frame-regions of the plurality of frame-regions. In an embodiment, various object regions of the video content that may be salient in appearance and motion may be identified based on the likelihood score that may score a region 'r' based on the likelihood information associated with the respective object regions. In an example embodiment, the likelihood score S(r) may be given by the following expression:

$$S(r)=A(r)+M(r)+G(r)$$

where, S(r) represents the likelihood score associated with the frame-region r,

A(r) represents an appearance score being determined based on the appearance information associated with the frame-region r, M(r) represents the motion score being determined based on the motion information associated with the frame-region r, and G(r) represents the spatial location score being determined based on the spatial location information associated with the frame-region r.

In an embodiment, the appearance information may include various features associated with the frame-regions, such as color, texture histogram intersection, boundary information of the objects, and the like. In an example embodiment, the appearance score may be derived based on a region ranking method, wherein a small number of regions may be generated in an image or a frame of the video content based on the object features such that each object may be represented by at least one region. In another example embodiment, the appearance score may be computed from a pre-trained category independent or dependent object detector.

In an example embodiment, the motion information M(r) may include difference in motion patterns relative to the object region r's surroundings. In an example embodiment, for computing the motion information, optical flow histograms, for example $h_f(r)$ and $h_f(\bar{r})$ may be computed for regions r and region $\bar{r}$ respectively. In an embodiment, the optical flow histograms, for example $h_f(r)$ and $h_f(\bar{r})$ may be formed by combining the closest surrounding regions of r and $\bar{r}$, respectively. In an example embodiment, the motion information M(r) may be computed as:

$$M(r)=1-\exp(-x^2(h_f(r),h_f(\bar{r})))$$

where $x^2(h_f(r),h_f(\bar{r}))$ is the $x^2$ distance between L1-normalized optical flow histograms.

In an example embodiment, the spatial location information G(r) may include an extent of overlap/intersection between the region (r) with the image border given that the background regions have a higher probability to intersect with the image border. In an example embodiment, the spatial location information G(r) may be computed based on the following expression:

$$G(r) = 1 - \frac{l(r)}{2(W+H)}$$

where, l(r) is the length of intersections between the region r and the image border of the corresponding frame, W and H represent the width and height, respectively of each frame.

In an example embodiment, the processor 202 is configured to, with the content of the memory 204, and optionally with other components described herein, to cause the apparatus 200 to compare the likelihood scores of the plurality of frame-regions with a threshold value of likelihood score. In an example embodiment, a processing means may be configured to compare the likelihood scores of the plurality of frame-regions with a threshold value of likelihood score. An example of the processing means may include the processor 202, which may be an example of the controller 108. In an embodiment, the apparatus is further caused to select the frame-regions from the plurality of frame-regions having the likelihood score greater than or equal to the threshold value of likelihood scores. In an example embodiment, a processing means may be configured to select the frame-regions having the likelihood score greater than or equal to the threshold value of likelihood scores. An example of the processing means may include the processor 202, which may be an example of the controller 108.

In an embodiment, for selecting the plurality of regions, instead of selecting the frame-regions having the likelihood score S(r) greater than or equal to the threshold value of likelihood score, the plurality of regions may be selected by choosing top N number of highest scoring frame-regions. For example, the top N (for example, 10) highest scoring frame-regions may be selected as the plurality of regions. In an example embodiment, the identified regions from the plurality of frames may be collectively configured to form a pool $\mathcal{P}$ of candidate object parts. An example of forming a pool $\mathcal{P}$ of example candidate object regions is explained further with reference to FIG. 3B.

In an example embodiment, the plurality of regions may also include regions associated with noisy background portion of the video content along with the regions associated with the target object. In an example embodiment, the at least one target object may include those objects of the scene that may be in motion. For example, in case of a person walking around a room, the target object may include the person while other objects such as computer and wardrobe that are immobile may form the non-target objects of the scene. In an example embodiment, the non-target object regions in the pool of the plurality of regions include noisy background regions associated with the video content.

In an example embodiment, the processor 202 is configured to, with the content of the memory 204, and optionally with other components described herein, to cause the apparatus 200 to identify and prune the non-target object regions. In an embodiment, the non-target object regions may be identified and pruned by clustering the target object regions and non-target object regions separately from the plurality of regions. In an embodiment, the target object regions and non-target object regions may be clustered based on spectrum clustering. In an embodiment, spectrum clustering may be utilized for identifying different groups of the object regions in the pool $\mathcal{P}$ of the plurality of regions. In an embodiment, different groups of the object regions may be determined by computing a similarity information between different region pairs of the plurality of regions. In an embodiment, the similarity information may be representative of ability to define similarity between region pairs of the plurality of regions. In an embodiment, the similarity information between the region pairs of the plurality of regions may be computed based on a determination of similarity between the regions of the region-pairs. In an embodiment, the similarity between the regions of the region-pairs may be computed by determining a pairwise affinity matrix computed between different regions of the plurality of regions. For example, a pairwise affinity matrix may be computed between regions $r_i$ and $r_j \in \mathcal{P}$. In an embodiment, the pairwise affinity matrix may be computed based on the following expression:

$$D(r_i, r_j) = \exp\left(-\frac{\chi^2(h_a(r_i), h_a(r_j))}{2\beta}\right) \quad (1)$$

wherein, $h_a(r_i)$ and $h_a(r_j)$ are the feature vectors of the regions $r_i$ and $r_j$ respectively, and $\beta$ is the average $x^2$ distance between the regions.

In an embodiment, the feature vectors $h_a(r_i)$ and $h_a(r_j)$ of the regions $r_i$ and $r_j$, respectively may be determined from the computation already performed using the bag-of-features method.

In an embodiment, the plurality of regions may be clustered into a plurality of clusters based on the similarity information. In an example embodiment, the region pairs associated with higher values of similarity information may be clustered in same cluster while the region pairs associated with lower (or nil) values of similarity information may be included in separate clusters. In an example embodiment, a processing means may be configured to cluster the plurality of regions into a plurality of clusters based on a similarity information associated with respective region pairs of the plurality of regions. An example of the processing means may include the processor 202, which may be an example of the controller 108. An example of generation of groups based on spectrum clustering is illustrated and explained with reference to FIG. 3C. In an embodiment, the plurality of clusters may include separate clusters associated with the target object and non-target objects. In an embodiment, for determining the clusters associated with the target object and non-target objects, a ranking of the clusters may be performed. In an example embodiment, the clusters representative of target object regions and the non-target object regions may be identified based on the likelihood information (for example, the score S(r)) associated with the corresponding object regions of the respective clusters). For example, for a cluster H comprising n object regions, the likelihood information for the n object regions may be consolidated, and the respective cluster H may be ranked based on the consolidated likelihood information. In an embodiment, the consolidation of the likelihood information may be performed by taking an average of the score S(r) of the n objects included in the respective cluster. In an example embodiment, a processing means may be configured to rank the plurality of clusters based on the likelihood score of corresponding regions forming a respective cluster of the plurality of clusters. An example of the processing means may include the processor 202, which may be an example of the controller 108. In an embodiment, the clusters associated with the ranks greater than or equal to a threshold rank may be categorized as clusters associated with the target object regions. For example, the clusters with ranks till (number) 2 may be the clusters having the target object regions. In an example embodiment, the remaining clusters having ranks lower than the threshold rank may form the clusters corresponding to the non-target object regions. In an embodiment, the clusters associated with the target object regions may include a first set of target object regions, and the clusters associated with the non-target object regions may include at least one set of non-target object regions.

In an embodiment, the clusters corresponding to the target object regions may include sparse object regions since the target object regions are derived from a small number of frames of the whole video since only a subset of the highest ranked regions may correspond to the target object. Herein, the sparse object regions may refer to the regions associated with spatial and temporal sparseness in the video content. The term spatial sparseness may indicate that the highest ranked regions (object proposals) cover a limited part of the target object. The term temporal sparseness may indicate that the highest ranking regions are selected from a small number of frames post-clustering, and so the sparse target object regions may provide a limited knowledge about the target object. For example, in case the target object is in motion or associated with a change of appearance, the sparse target object regions may not be able to provide an explicit model of the target object. In an embodiment, the apparatus 200 is caused to generate dense and spatio-temporally coherent target object regions to thereby provide a comprehensive and accurate description of the target object. In an example embodiment, the apparatus 200 may be caused to generate dense and spatio-temporally coherent target object regions by propagating the sparse target object regions and sparse non-target object regions. For the brevity of discussion, the sparse target object regions and the sparse non-target object regions may hereinafter collectively be referred to as sparse object regions.

In an example embodiment, the apparatus 200 is caused to propagate the sparse object regions by performing semi-supervised learning based on the target object regions and the non-target object regions. In an example embodiment, the set of target object regions may correspond to positive examples and the at least one set of non-target object regions may correspond to negative examples for performing the semi-supervised learning. In an example embodiment, the apparatus 200 is caused to train a classifier based on the sparse object regions (including the positive examples and the negative examples). In an example embodiment, the clusters associated with the ranks greater than or equal to the threshold rank (for example, the clusters associated with the target object regions) may be treated as positive examples for training the classifier. In an embodiment, the remaining clusters having ranks lower than the threshold rank (for example, the clusters corresponding to the non-target object regions) may be treated as negative examples for training the classifier. In an example embodiment, the negative examples may be selected by randomly sampling the regions outside a bounding box of the regions associated with the positive examples. In an embodiment, the corresponding regions associated with the positive examples and the negative examples may serve as labeled data for training the classifier. Herein, the labeled data may represent the regions associated with known at least one label, for example, either regions associated with the positive examples or negative examples. The labeled data may be utilized for training the classifier. In an example embodiment, a processing means may be configured to train a classifier for labeling the plurality of unlabeled regions of the video content based on the plurality of clusters associated with the first set of target object regions and the at least one set of non-target object regions. An example of the processing means may include the processor 202, which may be an example of the controller 108. In an example embodiment, the classifier may be a linear support vector machine (SVM) classifier.

In an example embodiment, the apparatus 200 is caused to apply the trained classifier to a plurality of unlabeled regions of the video content to thereby provide a classification of the unlabeled regions into at least one label. Herein, the term 'unlabeled data' may refer to the unknown regions within the video content. In an embodiment, the unlabeled regions of the video content may include those regions in the video content that may not be associated with the label. In an embodiment, the unlabeled regions may include regions of the video content that may not be labeled as either positive examples or negative examples during the training of the classifier. In an embodiment, the apparatus 200 may be caused to associate at least one label to the unlabeled regions of the video content based on the training and classification of the labeled regions by the classifier. In an example embodiment, a processing means may be configured to apply the trained classifier to a plurality of unlabeled regions of the video content to thereby provide a classification of the unlabeled regions into at least one label. An example of the processing means may include the processor 202, which may be an example of the controller 108.

In an example embodiment, upon classification, the apparatus 200 is caused to assign a weight (Y) to the unlabeled regions of the video content. In an embodiment, the weight may include an SVM margin. In an example embodiment, the weights assigned to the unlabeled regions of the video content may be normalized between −1 and 1. In an example embodiment, a processing means may be configured to assign the weigh to the unlabeled regions of the video content. An example of the processing means may include the processor 202, which may be an example of the controller 108. An example of application of the classifier to the unlabeled regions of the video content is illustrated and explained with reference to FIG. 3D.

In an example embodiment, the processor 202 is configured to, with the content of the memory 204, and optionally with other components described herein, to cause the apparatus 200 to determine optimal labels for respective regions of the plurality of unlabeled regions based on a minimization of an energy function associated with the respective regions of the plurality of regions. In an embodiment, a undirected space-time graph $\mathcal{G}=(V,\epsilon)$ span through the video content may be generated for minimization of the energy function. In an example embodiment, the space-time graph may span through the video content with respective nodes corresponding to the regions of the plurality of regions, and respective edges connecting two regions based on spatial and temporal adjacencies of the regions. In an example embodiment, the processor 202 is configured to, with the content of the memory 204, and optionally with other components described herein, to cause the apparatus 200 to determine the temporal adjacency between the regions based on optical flow motion vectors. In an example embodiment, the apparatus 200 may be caused to warp the regions associated with a current frame based on motion estimation, and compute an overlapping ratio between the current region and the overlapping regions in the next frame. In an embodiment, if the overlapping ratio between the current frame and the overlapping regions is greater than or equal to a predetermined overlapping ratio, then the current region and the overlapping region associated with the current frame may be temporally adjacent. For example, if the predetermined overlapping ratio is 0.25, and the overlapping ratio between the current region and the overlapping regions is determined to be greater than 0.25, then the current region and the overlapping regions may be temporally adjacent.

In an example embodiment, for a pair of neighboring regions (or a pair of vertices on the space-time graph $(r_i, r_j) \in \epsilon$), the weight of the edge linking the neighboring regions may be defined as in equation (1). In an embodiment, the edge weight may be denoted by $W_{ij}=D(r_i,r_j)$. In an embodiment, the weight of an edge $W_{ij}$ may be zero in case the regions $r_i$ and $r_j$ connected by that edge are not adjacent regions.

In an example embodiment, the apparatus 200 may be caused to propagate the labels from the first set of object regions representing the sparse object regions to the unlabeled regions on this space-time graph by performing semi-supervised learning. In an example embodiment, the processor 202 is configured to, with the content of the memory 204, and optionally with other components described herein, to cause the apparatus 200 to assign a label to the plurality of unlabeled regions based on the labels determined by SVM classifier such that the joint labeling (X) minimizes an energy function E(X). In an example embodiment, the energy function E(X) may be given by the following expression:

$$E(X) = \sum_{i,j=1}^{N} W_{ij} \left| \frac{x_i}{\sqrt{F_{ii}}} - \frac{x_j}{\sqrt{F_{jj}}} \right|^2 \left| \sum_{i=1}^{N} \lambda |X_i - Y_i|^2 \right| \quad (2)$$

where, $$F_{ii} = \sum_{j=1}^{N} W_{ij},$$

and

Y is the desirable label of a region, wherein the value for Y is provided by the weights from the SVM classifier.
In an example embodiment, the energy function may be equated to a Laplacian label propagation formulation, which is equivalent to:

$$E(X)=X^T(1-S)X+\lambda|X-Y|^2 \quad (3)$$

where $S=F^{1/2}WF^{1/2}$

In an embodiment, the solution to the above-mentioned equation may be provided as in a linear system as:

$$(I-(1-\gamma)S)X = \gamma Y, \gamma = \frac{\lambda}{1+\lambda} \quad (4)$$

In an example embodiment, the processor 202 is configured to, with the content of the memory 204, and optionally with other components described herein, to cause the apparatus 200 to provide an optimal labeling of the unlabeled regions of the video by solving the linear equations as follows:

$$\tilde{X} = \gamma(I-(1-\gamma)S)^{-1}(Y_+ - Y_-) \quad (5)$$

where, $$Y_+ = \begin{cases} Y & \text{if } Y > 0 \\ 0 & \text{otherwise} \end{cases}$$

$$Y_- = \begin{cases} -Y & \text{if } Y < 0 \\ 0 & \text{otherwise} \end{cases}$$

In an embodiment, the regions whose label (X) is determined to be greater than 0 may be included to a second set of object regions, wherein the second set of object regions includes the target object regions. In an example embodiment, the second set of target object regions is denser that the first set of target object regions. In an embodiment, the second set of target object regions being denser than the first set of target object regions may refer to those object regions that may be spatially and temporally denser than the first set of target object regions. The spatially and temporally denser regions may indicate that the second set of target object regions are selected from the plurality of frames of the video content after performing classification by the classifier, and so the dense target object regions convey a detailed knowledge about the target object. In an example embodiment, in case of large video content, the video content may be partitioned into a plurality of smaller sized video clips, and the apparatus 200 may be caused to determine the target object regions from each of the partitioned video clips. In an example embodiment, the apparatus 200 may be utilized for streaming videos of arbitrary length.

In an example embodiment, the processor 202 is configured to, with the content of the memory 204, and optionally with other components described herein, to cause the apparatus 200 to facilitate in a comprehensive and accurate modeling of target objects and non-target objects of the video content based on the extracted dense and spatio-temporally coherent object regions (target object parts and non-target object parts) extracted as a result of semi-supervised learning being performed using the first set of object regions. In an example embodiment, the apparatus 200 may be caused to facilitate modeling of the at least one target object and non-target objects based on at least two of a pixel level modeling, a region level modeling and an object level modeling of the at least one of target object regions and the non-target object regions.

In an example embodiment, for performing pixel level modeling of the at least one object and the non-target object, the apparatus 200 is caused to estimate two Gaussian Mixture Models (GMM) in a color-space. In an example embodiment, the pixels belonging to the dense object parts may be utilized to train the GMM representing the target object. In an example embodiment, the pixels associated with the non-target object regions may be utilized for training the GMM for the non-target objects. In an example, the apparatus 200 may be caused to compute per-pixel probability maps associated with the plurality of frames of the video content for identifying the pixels belonging to one of the target object or non-target object, respectively.

In an example embodiment, for performing region level modeling of the at least one object and the non-target object, the apparatus 200 is caused to train a classifier, for example, a linear SVM classifier. In an embodiment, the SVM classifier may be trained based on the second set of object regions having the denser object regions. For example, the dense target-object regions may be considered as positive examples while the dense non-target object regions may be considered as negative examples for training the classifier. The trained classifier may be applied to the unlabeled regions across the whole video. Based on the classification, each unlabeled region in the video content may be assigned a weight, i.e. the SVM margin. In an embodiment, the weight assigned to the regions of the video content may be normalized between 0 and 1. In an example embodiment, the apparatus 200 may further be caused to compute the per-pixel probability map based on the per-region probability map computed based on classification being performed by the SVM classifier. In an embodiment, the per-pixel probability maps may be computed by identifying the regions to which the respective pixels belong.

In an embodiment, for performing object level modeling of the at least one object and the non-target object, the apparatus 200 is caused to, determine the target-object regions and the non-target object regions from the dense object regions based on the semi-supervised learning, and subsequent determination of optimal labeling based on the minimization of the energy function associated with the region labels. In an embodiment, the dense object regions provide information associated with shape and location of the target objects and the regions belonging to the target object parts may be utilized for performing segmentation of the target object from the respective frames of video content. In an example embodiment, the probability of pixels belonging to target object parts may be set to 1, and 0 otherwise.

In an example embodiment, a processing means may be configured to facilitate in modelling of a comprehensive and accurate modeling the at least one target object and non-target objects of the video content based on the extracted dense and spatio-temporally coherent object regions (target object regions and non-target object regions). An example of the processing means may include the processor 202, which may be an example of the controller 108. In an embodiment, an object modelling engine may be an example of the processing means.

In an example embodiment, the processor 202 is configured to, with the content of the memory 204, and optionally with other components described herein, to cause the apparatus 200 to perform segmentation of the at least one target object from the frames of the video content. In an example embodiment, the segmentation may be per-pixel segmentation. In an embodiment, the segmentation may be performed by connecting a predefined number of frames temporally with optical flow displacement to form a space-time graph $\mathcal{G} = (V, \epsilon)$. In an example embodiment, the nodes of the space-time graph may be pixels and edges may be 4 spatial neighbors within the same frame and 2 temporal neighbors in the adjacent frames. In an example embodiment, the apparatus 200 may be caused to perform video segmentation by assigning each pixel with a value to identify whether the pixel belongs to the target object region or the non-target object region. For example, the pixel belonging to the target object region may be assigned a value 1 while the pixel belonging to the non-target object region may be assigned a value 0. In an embodiment, the apparatus 200 is caused to minimize an energy function for achieving an optimized labeling of pixels. In an embodiment, the energy function may be given as below:

$$E(x) = \sum_{i \in v} D_i(x_i) + \alpha \sum_{i \in v, j \in N_i} V_{i,j}(x_i, x_j)$$

where, $N_i$ is the set of pixels neighboring to pixel i in the space-time graph, and
$\alpha$ is a parameter.

The unary term $D_i(\chi_i)$ defines the cost of assigning label $\chi_i$ (0 or 1) to pixel i, which is defined based on the per-pixel probability maps:

$D_i(\chi_i) = -\log(w_1 \cdot U_i^p(\chi_i) + w_2 \cdot U_i^r(\mathbf{102}_i) + (1-w_1-w_2) \cdot U_i^o(\chi_i))$ where $U_i^p(\chi_i)$, $U_i^r(\chi_i)$ and $U_i^o(\chi_i)$ represent the probability of observing pixel i given label $\chi_i$ based on the pixel, region and object level modeling respectively.

$w_1$ and $w_2$ are parameters. The pairwise term is defined as:

$$V_{i,j}(x_i, x_j) = [x_i \neq x_j] \exp\left(-\frac{(c_i - c_j)^2}{2\beta}\right)$$

where [·] denotes the indicator function taking values 1 (if true) or 0 (otherwise),
$(c_i - c_j)^2$ is the squared Euclidean distance between two adjacent pixels in a color space, and
$\beta = \langle (c_i - c_j)^2 \rangle$ with $\langle \cdot \rangle$ denotes an expectation or average.

In an embodiment, the graph-cut optimization may be performed on each of the graphs of the predefined number of frames to obtain the final segmentation of the target object.

Some example embodiments of generation of the dense object regions and segmentation of the target object in a video content are further described in reference to FIGS. 3A-3E, and 4A-4B. These FIGS. 3A-3E and 4A-4B represent one or more example embodiments only, and should not be considered limiting to the scope of the various example embodiments.

Figure 3A:
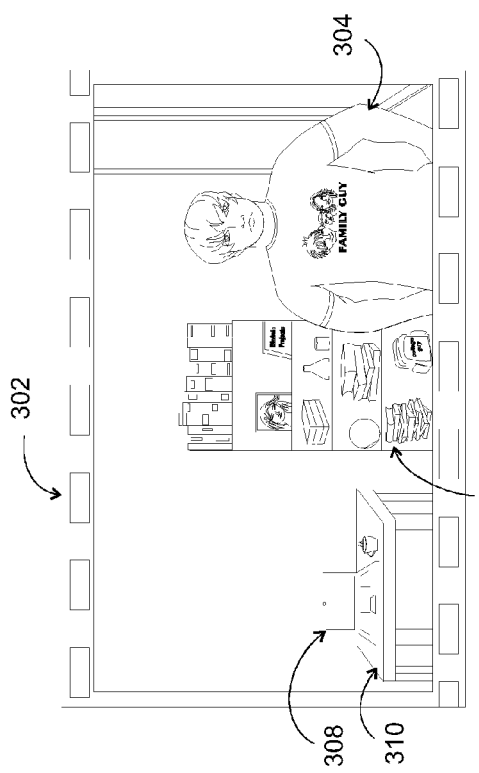
FIGS. 3A-3E represents an example of generation of dense object regions for segmentation of objects in a media content, in accordance with an example embodiment.

FIGS. 3A-3E represents example generation of dense object regions in accordance with an example embodiment. As illustrated, FIG. 3A illustrates a representation of a video content 302 displaying a scene. The scene is shown to include a person 304 in motion in a room. The room is shown to include various objects, such as a cupboard 306, a computer 308, a table 310 and the like. Herein, the person 304 walking through the room is in the foreground while other objects in the room form the background region of the scene. In an embodiment, the segmentation of the target object (for example, the person 304) from the frames of the video content may be performed by an apparatus, for example, the apparatus 200 (FIG. 2).

In an embodiment, for performing the segmentation, the video content 302 may be input to the apparatus 200. In an embodiment, the video content 302 may be a video recording or a video shot in a burst mode, for example, for about 3-4 seconds. Examples of the video content 302 may include a video presentation of a television program or a video shot, a short movie shot by a multimedia capturing device, and the like. In an embodiment, the video content may be captured by a media capturing device, for example, the device 100 (FIG. 1). Examples of the multimedia capturing device may include, but are not limited to, a camera, a mobile phone having multimedia capturing functionalities, and the like. In an embodiment, the multimedia content may be captured by using 3-D cameras, 2-D cameras, and the like. In an embodiment, the video content may be prerecorded and stored in the apparatus, for example the apparatus 200 (FIG. 2). In another embodiment, the video content 302 may be captured by utilizing the device, and stored in the memory of the device. In yet another embodiment, the device 100 may receive the video content from internal memory such as hard drive, random access memory (RAM) of the apparatus 200, or from external storage medium such as DVD, Compact Disk (CD), flash drive, memory card, or from external storage locations through Internet, Bluetooth®, and the like. The apparatus 200 may also receive the video content from the memory 204.

In an embodiment, the segmentation of the target object, for example, the person 304 in the frames of the video content may be performed by identifying sparse object regions in the video content 302, and propagating the sparse object regions to the dense object parts. In an embodiment, identifying the sparse object regions includes partitioning the plurality of frames of the media content into a plurality of frame-regions (or object parts), for example super-pixels and ranking the plurality of regions based on a likelihood information associated with the respective regions. In an embodiment, the plurality of frames may be partitioned into the plurality of frame-regions by determining feature descriptors associated with the respective frame-regions and computing the frame vectors from the feature descriptors. In an embodiment, the feature descriptors may include texture of the frame-regions. Additionally or alternatively, in an example embodiment, a color histogram (CH) of pixels and/or mean color value of pixels in a frame-region may be computed to determine the feature descriptor for that frame-region.

Figure 3B:
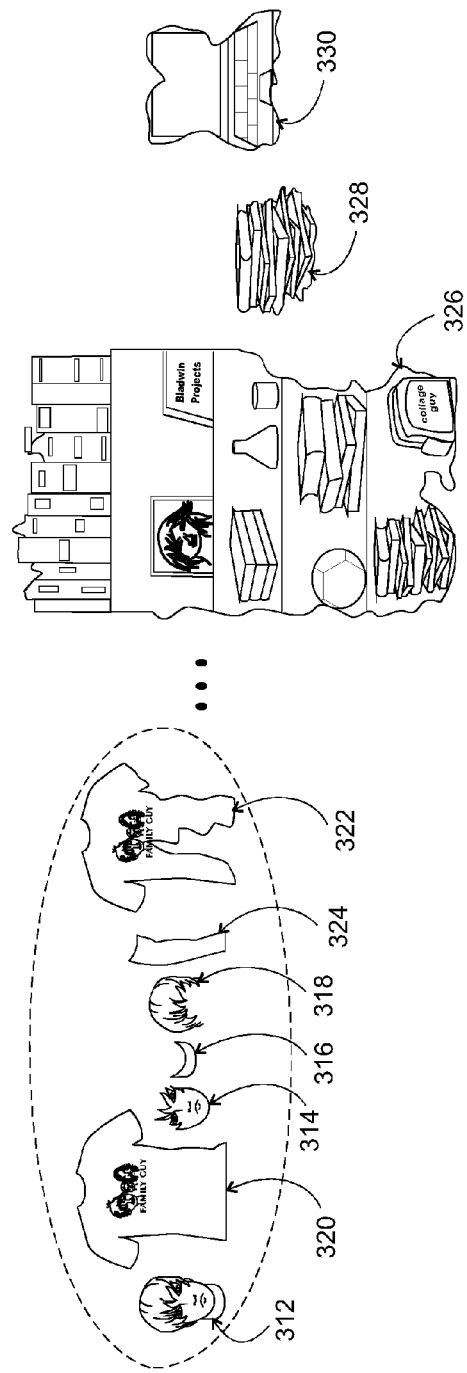

As illustrated in FIG. 3B, various frame-regions are extracted from the input video content 302. In the present example, the frame-regions includes face regions 312, 314, 316, 318 of the person 304, partial torso regions 320, 322 of the person 304, arm region 324 of the person 304, partial regions of articles 326, 328, 330 kept on in the room, and the like. In an embodiment, a pool (of the plurality of frame-regions) having extracted frame-regions from the plurality of frames is generated, as is illustrated in FIG. 3B.

Figure 3C:
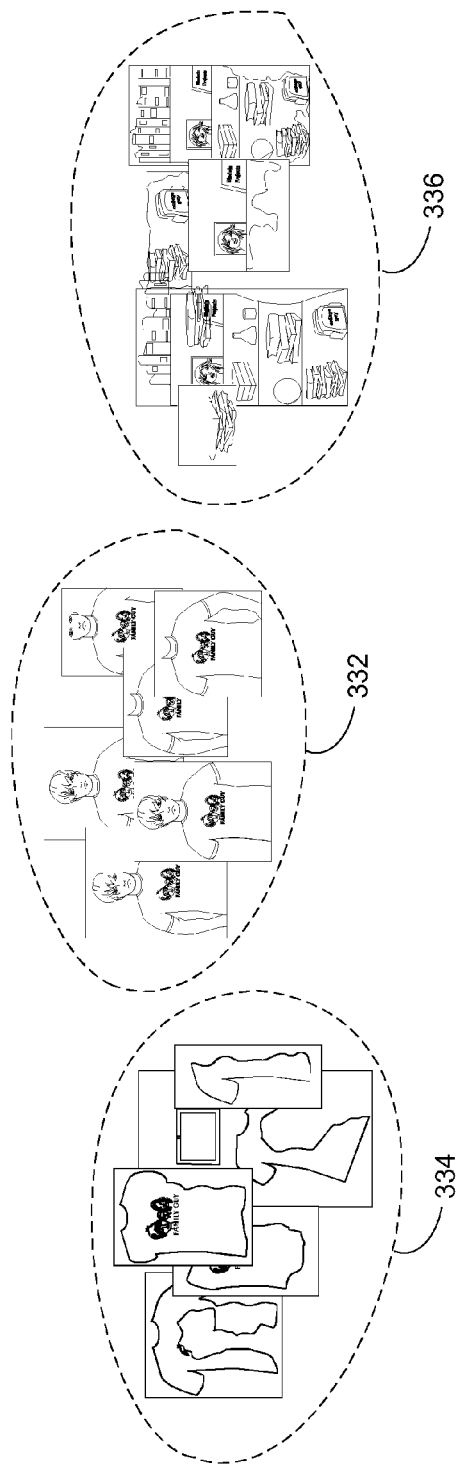

In an embodiment, the plurality of regions extracted from the plurality of frames that are included in the pool may be grouped into a plurality of clusters based on spectrum clustering. For example, the object regions of the pool may be clustered into groups 332, 334 and 336, as illustrated in FIG. 3C. In an embodiment, the clusters of the regions may be ranked based on the likelihood information associated with the components of the respective clusters. In an embodiment, the likelihood information may include an appearance information, a motion information, and a spatial location information. In an embodiment, the groups/clusters associated with the ranks greater than or equal to a threshold rank may be the groups associated with the target object regions. For example, as illustrated in FIG. 3C, the cluster 332 may form the cluster comprising target-object regions, while the clusters 334 and 336 comprises the non-target object regions.

Figure 3D:
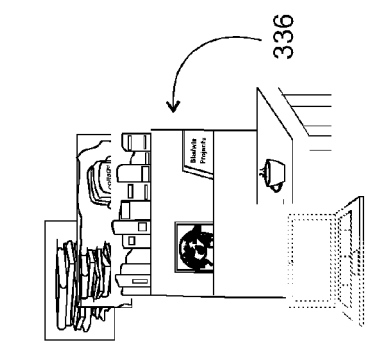
Figure 3E:
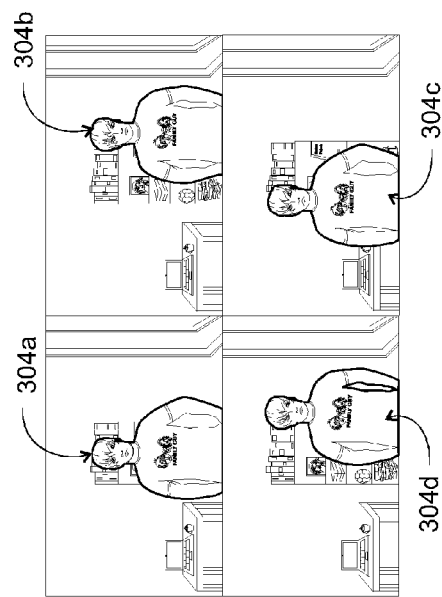

In an embodiment, a classifier may be trained by using the target object regions and the non-target object regions. For example, as illustrated in FIG. 3D, the clusters comprising target object regions (for example, the cluster 332) and the non-target object regions (for example, the clusters such as the cluster 336) may be input to a SVM classifier so as to train the classifier. The trained classifier may be utilized for labeling of unlabeled regions of the video content 302. In an embodiment, upon classification, a weight may be assigned to the unlabeled regions of the video content. In an embodiment, the weight may include an SVM margin. In an example embodiment, the weights assigned to the unlabeled regions of the video content may be normalized between −1 and 1. In an embodiment, optimal labels for respective regions of the plurality of unlabeled regions may be determined based on a minimization of an energy function associated with the respective regions. In an embodiment, the optimal labels facilitate in denser labeling of the regions of the video content to thereby generate a second set of target object regions wherein the second set of target object regions are denser than the first set of target object regions. In an embodiment, the dense object regions associated with the video content may facilitate in segmentation of the target object in the plurality of frames of video content. For example, as illustrated in FIG. 3E, the second set of target object regions may facilitate in segmentation of the image of the person 304 in various frames of the video content. Various segmented images of the person 304 are illustrated as 304a, 304b, 304c, and 304d, in FIG. 3E. In an embodiment, the he modelling of objects, for example, the target object and the non-target objects associated with the second set of target object regions may further facilitate in modelling of the target object and the non-target objects of the video content. The modelling of the target object and the non-target objects based on the extracted dense object regions in explained in FIGS. 4A and 4B.

Figure 4A:
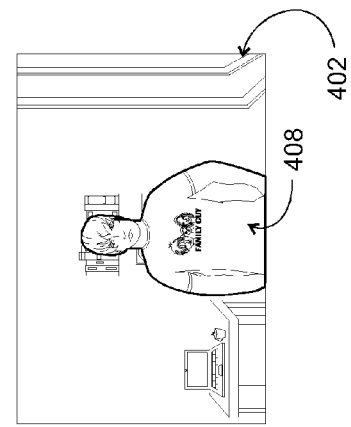
Figure 4A:
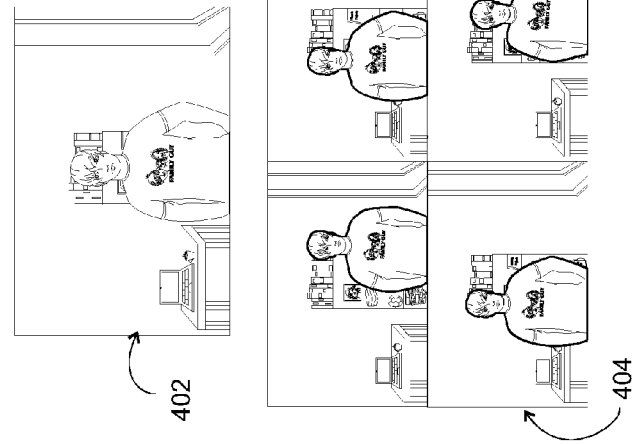

FIGS. 4A and 4B illustrates an example modeling and segmentation of a target object and non-target objects associated with a video content, for example the video content 302 of FIG. 3A, in accordance with an example embodiment. As discussed with reference to FIGS. 3A-3E, the video content 302 may be processed to extract a plurality of dense object regions associated with a target object. In an embodiment, the extracted dense and spatio-temporally coherent object regions may facilitate in a comprehensive and accurate modeling of the target object (for example, the foreground portion) and non-target objects (for example, the background portion) of the video content. As illustrated in FIG. 4A, a frame 402 may be provided as input along with the plurality of dense object regions 404 for modelling of the target object. In an embodiment, the modeling (represented as block 406) of the target object and non-target objects may be performed based on at least two of pixel level modeling, region level modeling associated with dense object regions, and object level modeling. In an embodiment, the modeling based on pixels of the dense object regions may be referred to as pixel-level modeling. In an embodiment, the modeling based on regions of the dense object regions may be referred to as region-level modeling. In an embodiment, the modeling based on objects of the dense object regions may be referred to as object-level modeling.

In an embodiment, the pixel-level modeling of the target object and the non-target objects may be performed based on estimation of two Gaussian Mixture Models (GMM) in a color-space. In an example embodiment, the pixels belonging to the dense object regions may be utilized to train the GMM representing the target object. In an example embodiment, the pixels associated with the non-target object regions may be utilized for training the GMM for the non-target object regions. In an example, the per-pixel probability maps associated with the plurality of frames of the video content may be computed for identifying the pixels belonging to one of the target object and non-target object, respectively.

In an example embodiment, for performing region level modeling of the at least one target object and the non-target object, a classifier, for example, a linear SVM classifier may be trained. In an embodiment, the SVM classifier may be trained based on dense object regions. For example, the dense target-object parts may be considered as positive examples while the dense non-target object regions may be considered as negative examples for training the classifier. The trained classifier may be applied to the unlabeled regions across the whole video. Based on the classification, each unlabeled region in the video content may be assigned a weight, i.e. the SVM margin. In an embodiment, the weight assigned to the regions of the video content may be normalized between values 0 and 1. In an example embodiment, the per-pixel probability map may be computed based on a per-region probability map, wherein the per-region probability map may be computed based on classification being performed by the SVM classifier. In an embodiment, the per-pixel probability map may be computed by identifying the regions to which the respective pixels belong.

In an embodiment, an object level modeling of the at least one target object and the non-target object, may be performed by determining the target-object regions and the non-target object regions from the dense object regions based on the semi-supervised learning, and subsequently determining optimal labeling based on the minimization of the energy function associated with the region labels. In an embodiment, the dense object regions provide information associated with shape and location of the target objects, and the regions belonging to the target objects may be utilized for performing segmentation of the target object from the respective frames of video content. In an example embodiment, the probability of pixels belonging to target object regions may be set to 1, and 0 otherwise.

In an embodiment, a segmentation of the target object may be performed based on an object model associated with the target object that is derived using dense object regions. In an embodiment, based on at least two of the pixel-level modeling, region level modeling and object level modeling, the segmentation of the target object in the frame 402 may be performed to generate a segmented target object 408. In an embodiment, the segmentation may include per-pixel segmentation. In an embodiment, the segmentation may be performed by assigning a value to each pixel to identify whether the pixel belongs to the target object regions or the non-target object regions. In an embodiment, a space-time graph may be constructed $\mathcal{G}=(V,\epsilon)$ by connecting a predefined number of frames temporally with optical flow displacement such that the nodes of the space-time graph may be pixels and edges may be 4 spatial neighbors within the same frame and 2 temporal neighbors in the adjacent frames. In an embodiment, values (or labels) may be assigned to each of the pixels based on a minimization of an energy function that may provide an optimal labeling of the pixels. In an example embodiment, the energy function may be given by the following expression:

$$E(x) = \sum_{i \in v} D_i(x_i) + \alpha \sum_{i \in v, j \in N_i} V_{i,j}(x_i, x_j)$$

where, $N_i$ is the set of pixels neighboring to pixel i in the graph and $\alpha$ is a parameter, and $D_i(\chi_i)$ defines the cost of assigning label $\chi_i$ (0 or 1) to the pixel i. In an embodiment, the term $D_i(\chi_i)$ may be defined based on the per-pixel probability maps computed based on the at least two of the pixel-level modeling, region level modeling and object level modeling. For example, in case the pixel-level modeling, region level modeling and object level modeling are performed for modeling of the target object, then the term $D_i(\chi_i)$ may be given by the following expression:

$$D_i(\chi_i) = -\log(w_1 \cdot U_i^p(\chi_i) + w_2 \cdot U_i^r(\chi_i) + (1-w_1-w_2) \cdot U_i^o(\chi_i))$$

where $U_i^p(\chi_i)$, $U_i^r(\chi_i)$ and $U_i^o(\chi_i)$ represent the probability of observing pixel i given label $\chi_i$ based on the pixel level modeling, region level modeling and object level modeling, respectively; and $w_1$ and $w_2$ are parameters The pairwise term $V_{i,j}$ may be defined as:

$$V_{i,j}(x_i, x_j) = [x_i \neq x_j] \exp\left(-\frac{(c_i - c_j)^2}{2\beta}\right)$$

where [·] denotes the indicator function taking values 1 (if true) or 0 (otherwise)

$(c_i-c_j)^2$ is the squared Euclidean distance between two adjacent pixels in a color space, and $\beta = <(c_i-c_j)^2>$ with <·> denoting an expectation or average.

The graph cut optimization may be performed on each of a predefined number of frame-graph to obtain the final segmentation of the target object in a plurality of frames, as illustrated in FIG. 4B. For example, FIG. 4B illustrates the plurality of frames having the segmented target objects such as 410a, 410b, 410c, 410d, 410e, 410f, 410g, and 410h.

Figure 5:
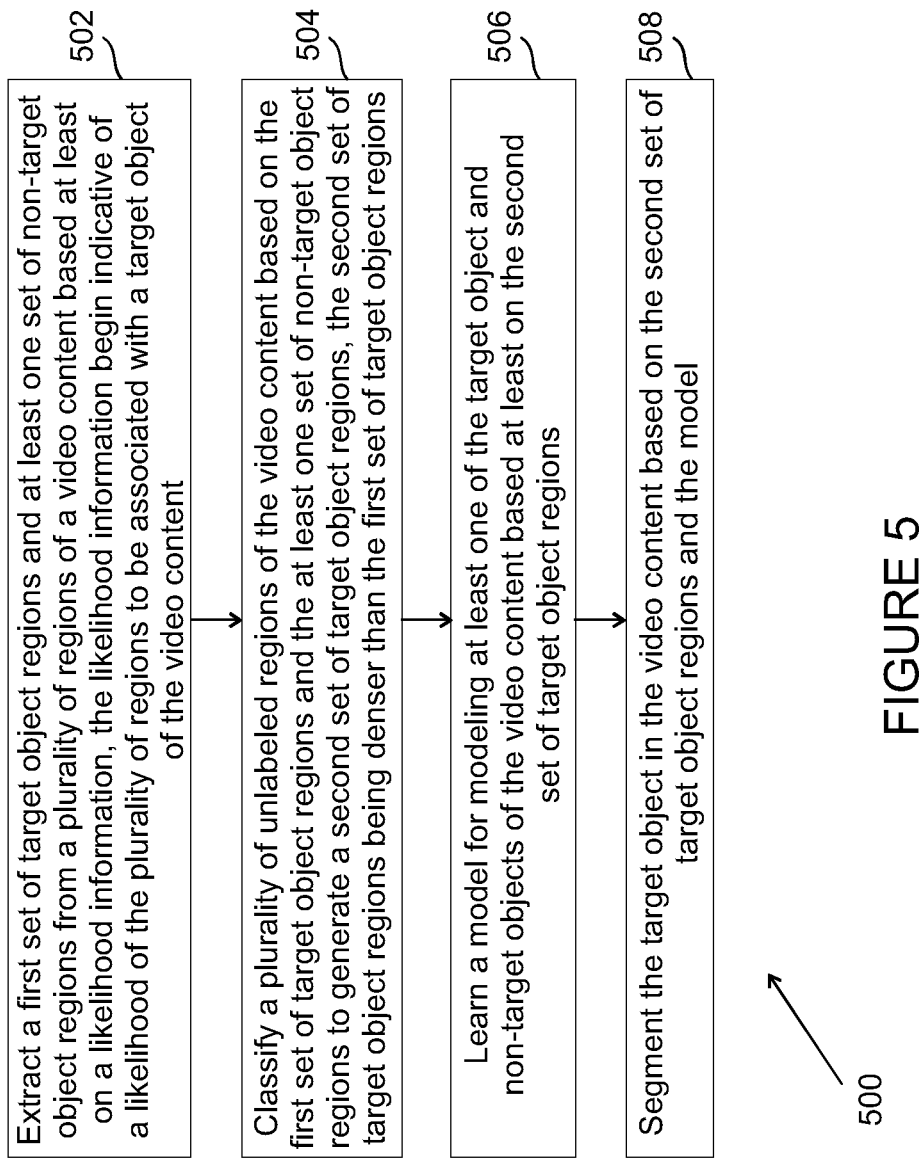
FIG. 5 is a flowchart depicting an example method for segmenting an object in a media content, in accordance with an example embodiment.

FIG. 5 is a flowchart depicting an example method 500 for segmentation of objects in a media content, in accordance with an example embodiment. The method 500 depicted in the flow chart may be executed by, for example, the apparatus 200 of FIG. 2.

At 502, the method includes extracting a first set of target object regions and at least one set of non-target object regions from a plurality of regions of a video content. In an embodiment, the video content may include a plurality of frame-regions (for example, super-pixels) in a plurality of frames. In an embodiment, the plurality of regions may be extracted from the plurality of frame-regions based on the likelihood information associated with the plurality of frame-regions. In an embodiment, the likelihood information is indicative of a likelihood of the plurality of regions to be associated with a target object of the video content. In an embodiment, the plurality of regions may be clustered into a plurality of clusters wherein the plurality of clusters may be associated with target object regions (for example, the first set of target object regions) and non-target object regions (for example, the at least one set of non-target object regions).

At 504, the method includes classifying a plurality of unlabeled regions of the video content based on the first set of target object regions and the at least one set of non-target object regions. In an embodiment, based on the classification, a second set of target object regions may be generated. In an embodiment, the second set of target object regions may be denser than the first set of target object regions. In an embodiment, classifying the plurality of unlabeled regions includes applying the classifier to the plurality of unlabeled regions of the video content, and assigning weights (Y) to the plurality of unlabeled regions based on the classifier. In an embodiment, optimal labels may be determined for one or more unlabeled regions of the plurality of unlabeled regions based on a minimization of an energy function associated with the one or more unlabeled regions to thereby classify the unlabeled regions into at least one label.

At 506, learning of a model for modelling at least one of the target object and non-target object of the video content based at least on the second set of target object regions may be performed. In an embodiment, learning the model may be performed based on at least two of a pixel level modeling, a region level modeling and an object level modeling of the at least one of target object regions and the non-target object regions.

At 508, the target object may be segmented in the video content based on the second set of target object regions and the model. In an embodiment, the object segmentation is performed by assigning each pixel with a value to identify whether the pixel belongs to the target object region or the non-target object region. For example, the pixel belonging to the target object region may be assigned a value 1 while the pixel belonging to the non-target object region may be assigned a value 0. In an embodiment, the target object region comprises a foreground and the non-target object region may include the background of the video content. The segmentation of the target object is illustrated with reference to FIG. 4B. In various example embodiments, the method 500 for segmenting the objects in a media content, for example a video content, may be performed at least in parts and under some circumstances automatically without involving manual intervention or user interaction. Various example embodiments of segmenting the target object in a media content are further described in reference with FIGS. 6A and 6B.

Figure 6A:
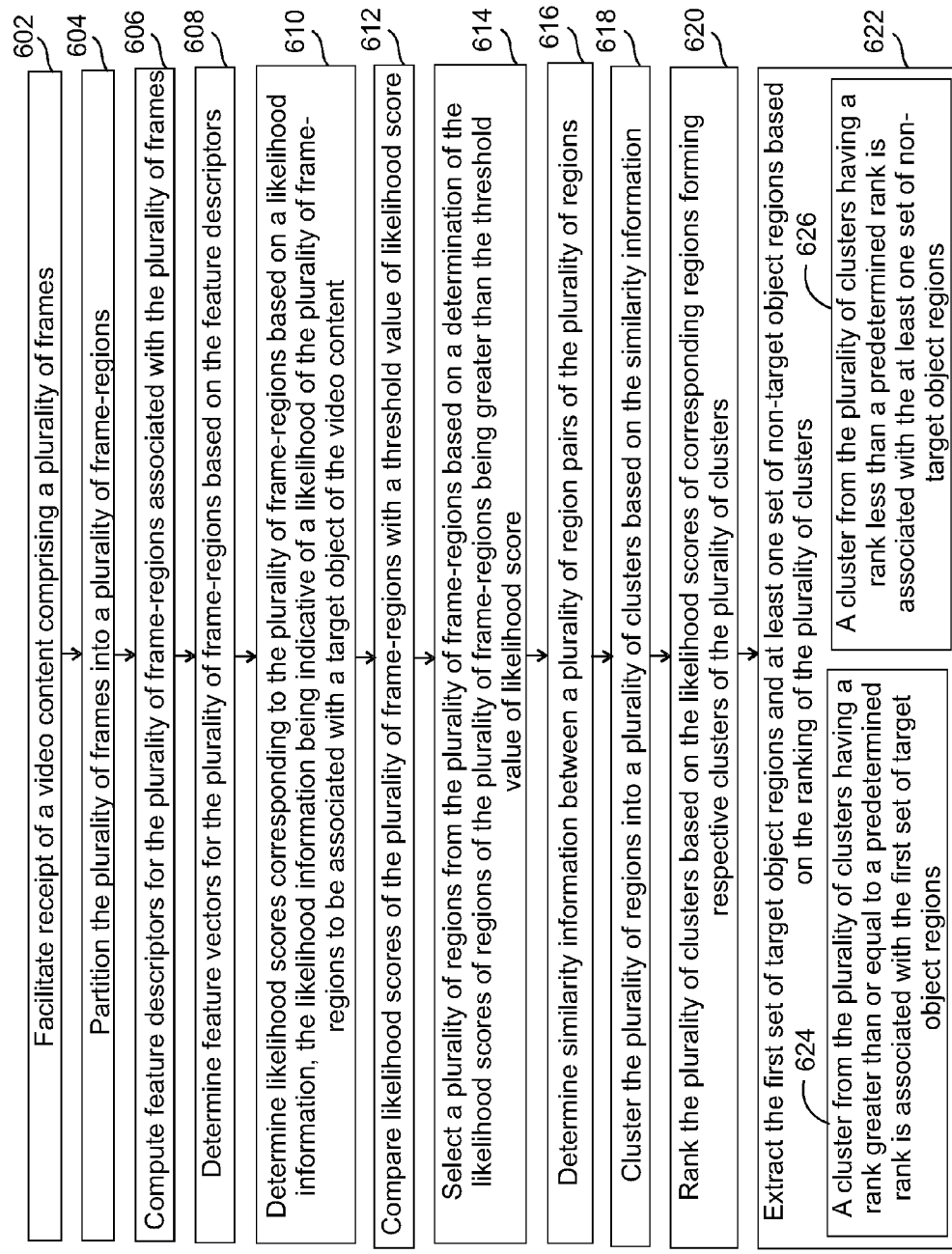
FIGS. 6A and 6B is a flowchart depicting an example method for segmenting an object in a media content, in accordance with another example embodiment.
Figure 6B:
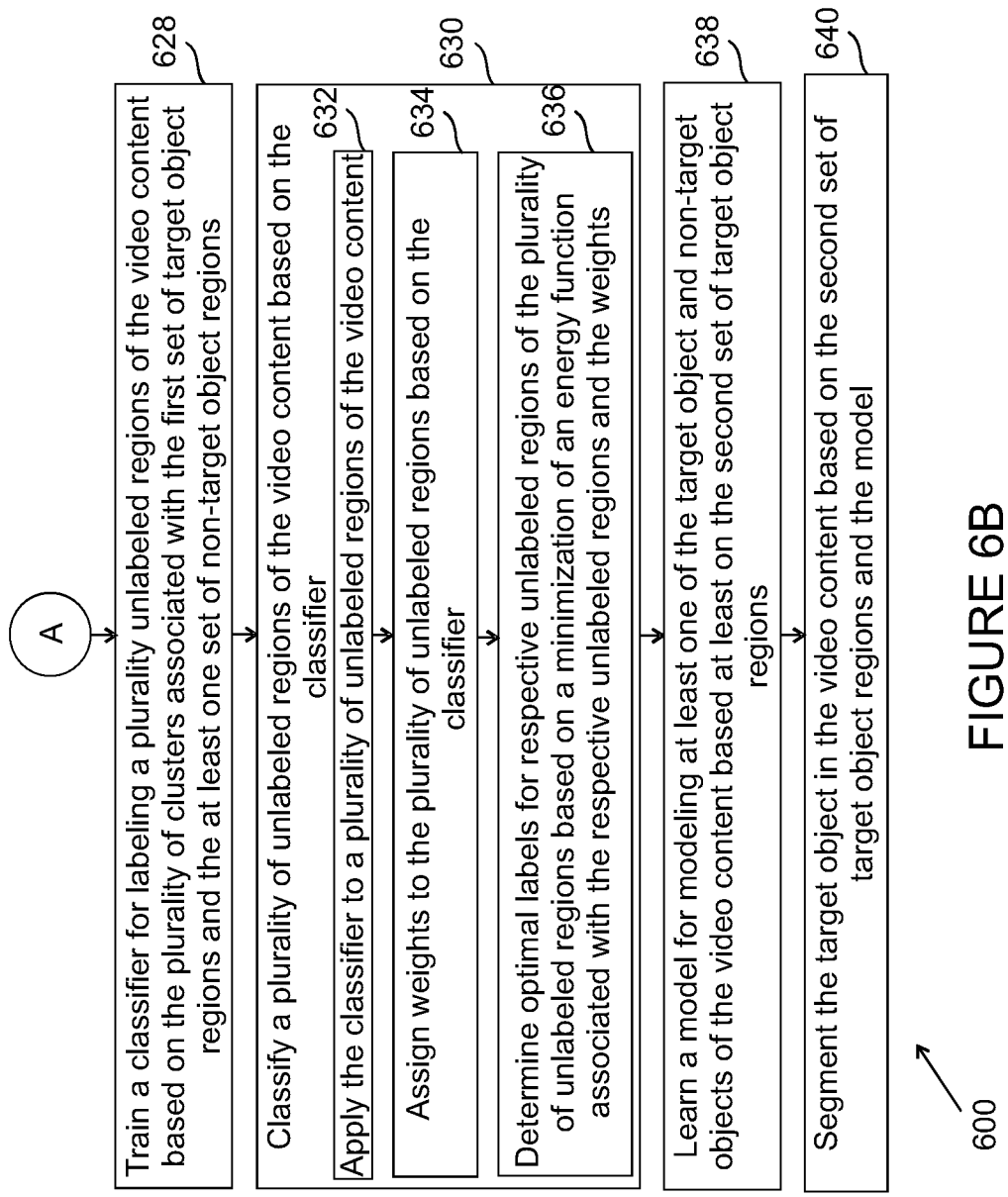

FIGS. 6A and 6B is a flowchart depicting an example method 600 for segmentation of objects in a media content for example, a video content, in accordance with another example embodiment. The method 600 depicted in the flow chart may be executed by, for example, the apparatus 200 of FIG. 2. The video content 302 (FIG. 3A) may be an example of the video content.

At 602, the method 600 includes facilitating receipt of the video content, for example the video content 302. In an embodiment, the video content may include a plurality of frames. In an embodiment, the video content may be associated with a scene. An example of a scene depicted by the video content is described with reference to FIG. 3A. In an embodiment, the video content may include a foreground portion and a background portion. In an example embodiment, the foreground portion may include a target object that is to be segmented from the video content.

At 604, the plurality of frames of the video content may be partitioned into a plurality of frame-regions. In an embodiment, the plurality of frame-regions includes plurality of super-pixels. At 606, the method includes computing feature descriptors for the plurality of frame-regions associated with the plurality of frames. In an example embodiment, the feature descriptors associated with a frame-region may define the characteristic and/or quality of the frame-region. At 608, based on the feature descriptors, feature vectors may be determined for the plurality of frame-regions. In an embodiment, facilitating receipt of the video content, partitioning the plurality of frames of the video content into the plurality of frame-regions, and extraction of features vectors of the plurality of frame-regions, may be performed by a preprocessing engine associated with an apparatus, for example the apparatus 200 that may be configured to perform object segmentation in the video content.

At 610, likelihood scores corresponding to the plurality of frame-regions may be determined based on a likelihood information. In an embodiment, the likelihood information may be indicative of a likelihood of the plurality of frame-regions to be associated with a target object of the video content. In an embodiment, the likelihood information for the respective plurality of frame-regions may include an appearance information, a motion information, and a spatial location information associated with the respective frame-region. As discussed with reference to FIG. 2, the likelihood score may be computed based on the following expression:

$$S(r)=A(r)+M(r)+G(r)$$

where, $S(r)$ represents the likelihood score associated with a frame-region r, $A(r)$ represents an appearance score being determined based on the appearance information associated with the frame-region r, $M(r)$ represents the motion score being determined based on the motion information associated with the frame-region r, and $G(r)$ represents the spatial location score being determined based on the spatial location information associated with the frame-region r.

The computation of $A(r)$, $M(r)$ and $G(r)$ is explained in detail with reference to FIG. 2. At 612, the likelihood scores of the plurality of frame-regions may be compared with a threshold value of likelihood scores. In an embodiment, the frame-regions having the likelihood score greater than or equal to the threshold value of likelihood scores may be selected as a plurality of regions, at 614. In an embodiment, for selecting the plurality of regions, instead of selecting the frame-regions having the likelihood score greater than or equal to the threshold value of likelihood score, the plurality of regions may be selected by choosing top N number of highest scoring frame-regions. In an embodiment, the selected plurality of regions may form a pool having candidate object regions.

In an embodiment, the plurality of regions may include non-target object regions (for example, regions associated with noisy background portion of the video content) in addition to the regions associated with the target object. In order to prune the non-target object regions, clustering may be performed to identify different groups of regions in the plurality of regions. In an embodiment, clustering may be performed based on a similarity information between a plurality of region pairs of the plurality of regions. In an embodiment, the similarity information between the region pairs of the plurality of regions may be computed based on a determination of similarity between the regions of the region-pairs. At 616, the similarity information between the plurality of region pairs of the plurality of regions may be determined. In an embodiment, the pair-wise similarity information may be determined by computing a pairwise affinity matrix between the plurality of region-pairs of the plurality of regions. In an embodiment, if the regions $r_i$ and $r_j \in \mathcal{P}$, then the pairwise affinity matrix may be computed as:

$$D(r_i, r_j) = \exp\left(-\frac{\chi^2(h_a(r_i), h_a(r_j))}{2\beta}\right)$$

where $h_a(r_i)$ and $h_a(r_j)$ are the feature vectors of the regions $r_i$ and $r_j$ respectively, and $\beta$ is the average distance ($x^2$) between the regions of the plurality of regions.

At 618, the plurality of regions may be clustered into a plurality of clusters based on the similarity information. In an embodiment, clustering the plurality of regions into the plurality of clusters may include performing spectrum clustering. In an embodiment, the plurality of clusters may include separate clusters associated with the target object and non-target objects. In an embodiment, for determining the clusters associated with the target object and non-target objects, a ranking of the clusters may be performed at 620. In an embodiment, the ranking of the clusters may be performed based on the likelihood scores of corresponding regions forming a respective cluster of the plurality of clusters. Based on ranking, the clusters including the first set of target object regions and the clusters including at least one set of non-target object regions may be extracted/separated, at 622. For example, at 624, a cluster from the plurality of clusters having a rank greater than or equal to a predetermined rank is determined to be associated with the first set of target object regions. In an embodiment, at 626, a cluster from the plurality of clusters having the rank less than the predetermined rank is determined to be associated with the at least one set of non-target object regions. In an embodiment, instead of comparing the ranks of the clusters with the predetermined rank to select the clusters associated with the first set of target object regions, the method 600 may include selecting M highest ranked clusters from among the plurality of clusters such that the M highest ranked clusters may correspond to the target object regions. In an embodiment, the clusters corresponding to the target object regions may include sparse target object regions.

In an embodiment, the sparse target object regions may be utilized for generating dense and spatio-temporally coherent object regions by propagating the extracted sparse target object regions. In an embodiment, the plurality of clusters comprising the clusters of target object regions and the clusters of non-target object regions may be utilized for classifying unlabeled regions of the video content. In an embodiment, the unlabeled regions of the video content may include those regions in the video content that may not be associated with the label. In an embodiment, the unlabeled regions may include regions of the video content that may not be labeled as either positive examples or negative examples during the training of the classifier.

At 628, a classifier may be trained for labeling the unlabeled regions of the video content based on the at least one cluster of target object regions and the at least one cluster of non-target object regions. In an embodiment, for training the classifier, the regions associated with the clusters of the at least one cluster of target object regions may be considered as positive examples, and the regions associated with the clusters having non-target object regions may be treated as negative examples. In an example embodiment, the classifier may be an SVM classifier.

At 630, a plurality of unlabeled regions of the video content may be classified based on the first set of target object regions and at least one set of non-target object regions to generate at least a second set of target object regions. For example, at 632, the trained classifier may be applied to the unlabeled regions of the video content to thereby provide a classification of the unlabeled regions into at least one label. At 634, upon classification, a weight may be assigned to the unlabeled regions of the video content based on the classification by the classifier. In an embodiment, the weight may include an SVM margin. In an example embodiment, the weights assigned to the unlabeled regions of the video content may be normalized between $-1$ and 1. At 636, optimal labels for respective unlabeled regions of the plurality of unlabeled regions may be determined based on a minimization of an energy function associated with the respective unlabeled regions. As discussed with reference to FIG. 2, in an example embodiment, the energy function $E(X)$ may be given by the following expression:

$$E(X) = \sum_{i,j=1}^{N} W_{ij}\left|\frac{X_i}{\sqrt{F_{ii}}} - \frac{X_j}{\sqrt{F_{jj}}}\right|^2 + \sum_{i=1}^{N} \lambda|X_i - Y_i|^2$$

where, $$F_{ii} = \sum_{j=1}^{N} W_{ij},$$

and

Y represents desirable labels of regions that are provided by the weights from the SVM classifier.

In an example embodiment, the energy function may be equated to laplacian label propagation formulation, which is equivalent to:

$$E(X) = X^T(1-S)X + \lambda|X-Y|^2$$

where $S = F^{1/2} W F^{1/2}$

In an embodiment, the solution to the above-mentioned equation may be provided as in a linear system as:

$$(I - (1-\gamma)S)X = \gamma Y, \gamma = \frac{\lambda}{1+\lambda}$$

In an example embodiment, an optimal labeling of the unlabeled regions of the video content may be provided by solving the linear equations as follows:

$$\tilde{X} = \gamma(I - (1-\gamma)S)^{-1}(Y_+ - Y_-)$$

where, $$Y_+ = \begin{cases} Y & \text{if } Y > 0 \\ 0 & \text{otherwise} \end{cases}$$

$$Y_- = \begin{cases} -Y & \text{if } Y < 0 \\ 0 & \text{otherwise} \end{cases}$$

In an embodiment, the regions whose label (X) is determined to be greater than 0 may be included to the set of target object regions. In an embodiment, the extracted dense and spatio-temporally coherent object regions (target object regions and non-target object regions) extracted as a result of semi-supervised learning may facilitate in modelling of a comprehensive and accurate modeling of the at least one target object and non-target objects of the video content. At

638, learning of a model for modelling at least one of the target object regions and non-target object regions of the video content based at least on the second set of target object regions is performed. In an example embodiment, learning the model for modelling the at least one of target object regions and non-target object regions of the video content is performed based on at least two of a pixel level modeling, a region level modeling and an object level modeling of the at least one of target object regions and non-target object regions. The pixel level modeling, the region level modeling and the object level modeling are already explained with reference to FIG. 4A.

At block 640, the target object in the video content is segmented based on the second set of target object regions and the model. In an embodiment, the object segmentation is performed by assigning each pixel with a value to identify whether the pixel belongs to the target object region or the non-target object region. For example, the pixel belonging to the target object region may be assigned a value 1 while the pixel belonging to the non-target object region may be assigned a value 0. In an embodiment, the target object region includes a foreground and the non-target object region includes the background of the video content. In an embodiment, an energy function may be minimized for achieving an optimized labeling of pixels. In an embodiment, the energy function may be given as below:

$$E(x) = \sum_{i \in v} D_i(x_i) + \alpha \sum_{i \in v, j \in N_i} V_{i,j}(x_i, x_j)$$

where, $N_i$ is a set of pixels neighboring to a pixel i in a space-time graph, and
$\alpha$ is a parameter.
The unary term $D_i(\chi_i)$ defines the cost of assigning label $\chi_i$ (0 or 1) to the pixel i, which is defined based on the per-pixel probability maps.

$$D_i(\chi_i) = -\log(w_1 \cdot U_i^p(\chi_i) + w_2 \cdot U_i^r(\chi_i) + (1-w_1-w_2) \cdot U_i^o(\chi_i))$$

where $U_i^p(\chi_i)$, $U_i^r(\chi_i)$ and $U_i^o(\chi_i)$ represent the probability of observing pixel i given label $\chi_i$ based on the pixel level modeling, region level modeling and object level modeling, respectively,
$w_1$ and $w_2$ are parameters.
The pairwise term $V_{i,j}$ is defined as:

$$V_{i,j}(x_i, x_j) = [x_i \neq x_j] \exp\left(-\frac{(c_i - c_j)^2}{2\beta}\right)$$

where [·] denotes the indicator function taking values 1 (if true) or 0 (otherwise),
$(c_i - c_j)^2$ is the squared Euclidean distance between two adjacent pixels in a color space, and $\beta = \langle (c_i - c_j)^2 \rangle$ with $\langle \cdot \rangle$ denoting the expectation or average.
The graph cut optimization is performed on each three-frame graph to obtain the final segmentation.

It should be noted that to facilitate discussions of the flowcharts of FIGS. 5 and 6A-6B, certain operations are described herein as constituting distinct steps performed in a certain order. Such implementations are examples only and non-limiting in scope. Certain operation may be grouped together and performed in a single operation, and certain operations can be performed in an order that differs from the order employed in the examples set forth herein. Moreover, certain operations of the methods 500 and 600 are performed in an automated fashion. These operations involve substantially no interaction with the user. Other operations of the methods 500 and 600 may be performed by in a manual fashion or semi-automatic fashion. These operations involve interaction with the user via one or more user interface presentations.

The methods depicted in these flow charts may be executed by, for example, the apparatus 200 of FIG. 2. Operations of the flowchart, and combinations of operation in the flowcharts, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus provide operations for implementing the operations in the flowchart. The operations of the methods are described with help of apparatus 200. However, the operations of the methods can be described and/or practiced by using any other apparatus.

Without in any way limiting the scope, interpretation, or application of the claims appearing below, a technical effect of one or more of the example embodiments disclosed herein is to perform segmentation of objects in media content for example video content. Various embodiments provide methods for facilitating segmentation of objects without user interaction. The segmentation of the objects may be performed even in case of fast moving objects and/or objects associated with fast appearance variation. In various embodiment, the segmentation is performed by initially splitting the frames of the video content into a plurality of regions (for example, super-pixels), thereby precluding a need to restrict the length of the video content. Various embodiments facilitates in processing of large video sequences for object segmentation, wherein the large video sequences (or video content) may be split up into a plurality of video clips, and the plurality of video clips may be individually processed for object segmentation.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer. In one example embodiment, the computer readable medium may be non-transitory.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

The invention claimed is:

1. A method comprising:
    extracting a first set of target object regions and at least one set of non-target object regions from a plurality of regions of a video content based at least on a likelihood information, the likelihood information being indicative of a likelihood of the plurality of regions to be associated with a target object of the video content;
    classifying a plurality of unlabeled regions of the video content based on the first set of target object regions and the at least one set of non-target object regions to generate a second set of target object regions, the second set of target object regions being denser than the first set of target object regions;
    learning a model for modelling at least one of the target object and non-target objects of the video content based at least on the second set of target object regions; and
    segmenting the target object in the video content based on the model and the second set of target object regions.

2. The method as claimed in claim 1, wherein extracting the first set of target object regions and the at least one set of non-target object regions further comprises:
    determining likelihood scores for a plurality of frame-regions associated with the video content based on the likelihood information, the plurality of frame-regions being generated based on a partitioning of a plurality of frames of the video content;
    selecting the plurality of regions from the plurality of frame-regions having the likelihood scores greater than or equal to a threshold value of the likelihood score;
    clustering the plurality of regions into a plurality of clusters based on a similarity information associated with respective region pairs of the plurality of regions; and
    ranking the plurality of clusters based on the likelihood score of corresponding regions forming a respective cluster of the plurality of clusters, wherein the respective cluster having a rank greater than or equal to a predetermined rank is determined to be associated with the first set of target object regions, and wherein the respective cluster having the rank less than the predetermined rank is determined to be associated with the at least one set of non-target object regions.

3. The method as claimed in claim 1, further comprising determining the likelihood information associated with respective frame-regions of the plurality of frame-regions based on an appearance information, a motion information, and a spatial location information associated with the respective frame-regions of the plurality of frame-regions.

4. The method as claimed in claim 1, further comprising training a classifier for labeling the plurality of unlabeled regions of the video content based on the plurality of clusters associated with the first set of target object regions and the at least one set of non-target object regions.

5. The method as claimed in claim 4, wherein the plurality of unlabeled regions of the video content comprises regions of the video content not associated with the first set of target object regions and the at least one set of non-target object regions.

6. The method as claimed in claim 1, wherein the second set of target object regions being denser than the first set of target object regions comprises the second set of target object regions being spatially and temporally denser than the second set of target object regions.

7. The method as claimed in claim 1, wherein classifying the plurality of unlabeled regions comprises:
    applying the classifier to the plurality of unlabeled regions of the video content;
    assigning weights (Y) to the plurality of unlabeled regions based on the classifier; and
    determining optimal labels (X) for one or more unlabeled regions of the plurality of unlabeled regions based on a minimization of an energy function associated with the one or more unlabeled regions.

8. An apparatus comprising:
    at least one processor; and
    at least one memory comprising computer program code, the at least one memory and the computer program code configured to, with the at least one processor, cause the apparatus to at least perform:
        extract a first set of target object regions and at least one set of non-target object regions from a plurality of regions of a video content based at least on a likelihood information, the likelihood information being indicative of a likelihood of the plurality of regions to be associated with a target object of the video content;
        classify a plurality of unlabeled regions of the video content based on the first set of target object regions and the at least one set of non-target object regions to generate a second set of target object regions, the second set of target object regions being denser than the first set of target object regions;
        learn a model for modelling at least one of the target object and non-target objects of the video content based at least on the second set of target object regions; and
        segment the target object in the video content based on the model and the second set of target object regions.

9. The apparatus as claimed in claim 8, wherein the apparatus is further caused at least in part to determine the likelihood information associated with respective frame-regions of the plurality of frame-regions based on an appearance information, a motion information, and a spatial location information associated with the respective frame-regions of the plurality of frame-regions.

10. The apparatus as claimed in claim 8, wherein the apparatus is further caused at least in part to train a classifier for labeling the plurality of unlabeled regions of the video content based on the plurality of clusters associated with the first set of target object regions and the at least one set of non-target object regions.

11. The apparatus as claimed in claim 10, wherein the plurality of unlabeled regions of the video content comprises regions of the video content not associated with the first set of target object regions and the at least one set of non-target object regions.

12. The apparatus as claimed in claim 8, wherein the second set of target object regions being denser than the first set of target object regions comprises the second set of target object regions being spatially and temporally denser than the second set of target object regions.

13. The apparatus as claimed in claim 8, wherein classifying the plurality of unlabeled regions comprises:
applying the classifier to the plurality of unlabeled regions of the video content;
assigning weights (Y) to the plurality of unlabeled regions based on the classifier; and
determining optimal labels (X) for one or more unlabeled regions of the plurality of unlabeled regions based on a minimization of an energy function associated with the one or more unlabeled regions.

14. The apparatus as claimed in claim 8, wherein for extracting the first set of target object regions and the at least one set of non-target object regions, the apparatus is further caused, at least in part to:
determine likelihood scores for a plurality of frame-regions associated with the video content based on the likelihood information, the plurality of frame-regions being generated based on a partitioning of a plurality of frames of the video content;
select the plurality of regions from the plurality of frame-regions having the likelihood scores greater than or equal to a threshold value of the likelihood score;
cluster the plurality of regions into a plurality of clusters based on a similarity information associated with respective region pairs of the plurality of regions; and
rank the plurality of clusters based on the likelihood score of corresponding regions forming a respective cluster of the plurality of clusters, wherein the respective cluster having a rank greater than or equal to a predetermined rank is determined to be associated with the first set of target object regions, and wherein the respective cluster having the rank less than the predetermined rank is determined to be associated with the at least one set of non-target object regions.

15. A computer program product comprising at least one non-transitory computer-readable storage medium, the non-transitory computer-readable storage medium comprising a set of instructions, which, when executed by one or more processors, cause an apparatus to at least perform:
extract a first set of target object regions and at least one set of non-target object regions from a plurality of regions of a video content based at least on a likelihood information, the likelihood information being indicative of a likelihood of the plurality of regions to be associated with a target object of the video content;
classify a plurality of unlabeled regions of the video content based on the first set of target object regions and the at least one set of non-target object regions to generate a second set of target object regions, the second set of target object regions being denser than the first set of target object regions;
learn a model for modelling at least one of the target object and non-target objects of the video content based at least on the second set of target object regions; and
segment the target object in the video content based on the model and the second set of target object regions.

16. The computer program product as claimed in claim 15, wherein for extracting the first set of target object regions and the at least one set of non-target object regions, the apparatus is further caused, at least in part to:
determine likelihood scores for a plurality of frame-regions associated with the video content based on the likelihood information, the plurality of frame-regions being generated based on a partitioning of a plurality of frames of the video content;
select the plurality of regions from the plurality of frame-regions having the likelihood scores greater than or equal to a threshold value of the likelihood score;
cluster the plurality of regions into a plurality of clusters based on a similarity information associated with respective region pairs of the plurality of regions; and
rank the plurality of clusters based on the likelihood score of corresponding regions forming a respective cluster of the plurality of clusters, wherein the respective cluster having a rank greater than or equal to a predetermined rank is determined to be associated with the first set of target object regions, and wherein the respective cluster having the rank less than the predetermined rank is determined to be associated with the at least one set of non-target object regions.

17. The computer program product as claimed in claim 15, wherein the apparatus is further caused at least in part to determine the likelihood information associated with respective frame-regions of the plurality of frame-regions based on an appearance information, a motion information, and a spatial location information associated with the respective frame-regions of the plurality of frame-regions.

18. The computer program product as claimed in claim 15, wherein the apparatus is further caused at least in part to train a classifier for labeling the plurality of unlabeled regions of the video content based on the plurality of clusters associated with the first set of target object regions and the at least one set of non-target object regions.

19. The computer program product as claimed in claim 18, wherein the plurality of unlabeled regions of the video content comprises regions of the video content not associated with the first set of target object regions and the at least one set of non-target object regions.

20. The computer program product as claimed in claim 15, wherein the second set of target object regions being denser than the first set of target object regions comprises the second set of target object regions being spatially and temporally denser than the second set of target object regions.

21. The computer program product as claimed in claim 15, wherein classifying the plurality of unlabeled regions comprises:
applying the classifier to the plurality of unlabeled regions of the video content;
assigning weights (Y) to the plurality of unlabeled regions based on the classifier; and determining optimal labels (X) for one or more unlabeled regions of the plurality of unlabeled regions based on a minimization of an energy function associated with the one or more unlabeled regions.

* * * * *